Dec. 3, 1957        C. E. STUART        2,814,876
MANDIBULAR MOVEMENT RECORDER
Filed March 31, 1955        2 Sheets-Sheet 1
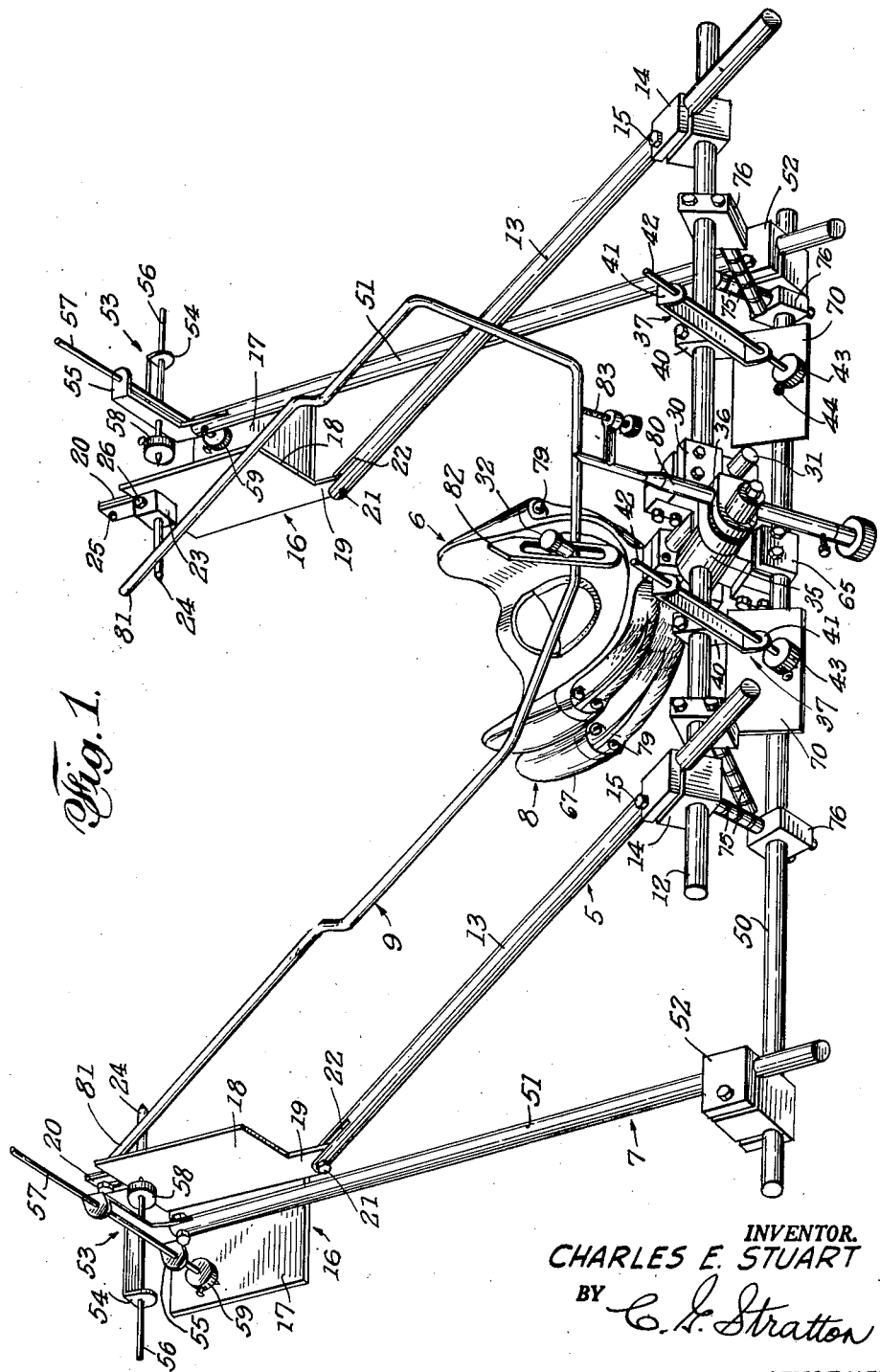
INVENTOR.
CHARLES E. STUART
BY *C. T. Stratton*
ATTORNEY Dec. 3, 1957 — C. E. STUART — 2,814,876
MANDIBULAR MOVEMENT RECORDER
Filed March 31, 1955 — 2 Sheets-Sheet 2
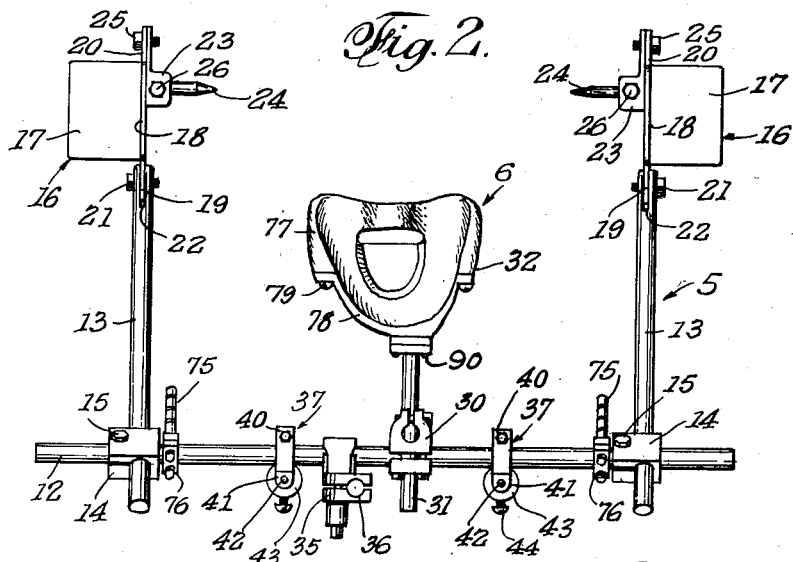
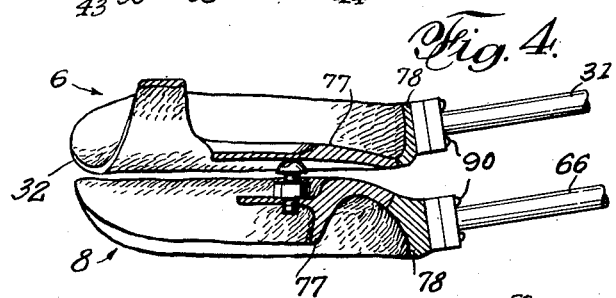
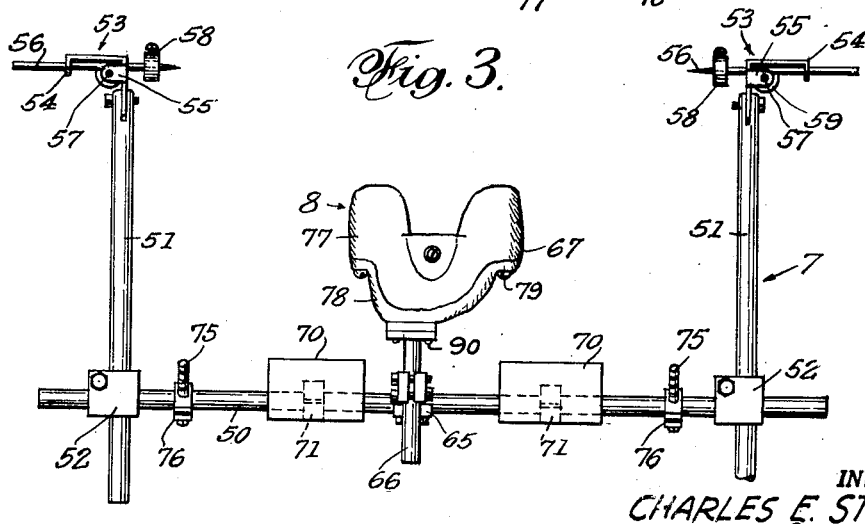
INVENTOR.
CHARLES E. STUART
BY C. F. Stratton
ATTORNEY

United States Patent Office 2,814,876
Patented Dec. 3, 1957

2,814,876

MANDIBULAR MOVEMENT RECORDER

Charles E. Stuart, Ventura, Calif.

Application March 31, 1955, Serial No. 498,202

16 Claims. (Cl. 32—19)

This invention relates to a device, used in the practice of dentistry, for recording the direction and magnitude of movement of the human mandible, and it is an object of this invention to provide a novel and improved device of this nature.

Another object of the invention is to provide a mandibular movement recording device that is assembled and adjusted to the movements of the mandibular joints of and on the human head and, when removed from the head and mounted in a conventional dental articulator, is adapted to be adjusted to reproduce the entire envelope of motion described by the jaws of the person from whose head removed.

Therefore, another object of the invention is to provide an instrument which will accurately record mandibular movements and is adapted for use in guiding a dentist or dental mechanic in adjusting a dental articulating instrument so that said instrument will reproduce the same paths of jaw movement that are described by the jaws of the person, patient or subject to whose jaws dentures are to be fitted according to the record provided by the present instrument.

Other objects of the invention are to provide a device of the character referred to that is light in weight, is arranged to have a minimum of friction among the parts, is facile and rapid to operate, is adapted for quick deletion of error and as quick correction of the same, produces direct recordings of direction and magnitude of the mandibles, and does not entail processing to translate the direct recordings that are made.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes, one embodiment of the present invention, which is given by way of illustration or example only.

In the drawings, like reference characters designate similar parts in the several views.

Fig. 1 is a perspective view of a mandibular movement recorder according to the present invention.

Fig. 2 is a reduced scale plan view of an upper or auxiliary bow part of said recorder.

Fig. 3 is a similar view of a lower or mandibular bow part of said recorder.

Fig. 4 is an enlarged longitudinal sectional view of jaw-clutching means used in the invention.

The recorder that is illustrated comprises, generally, an upper bow assembly 5 incorporating clutch means 6 by means of which said bow is removably affixed to the upper jaw and to the part of a dental articulator that corresponds to the upper jaw, a lower bow assembly 7 incorporating clutch means 8 by means of which said latter bow is removably affixed to the lower jaw and to the part of a dental articulator that corresponds thereto, and an axis-orbital plane recorder bow 9 removably carried by the upper bow assembly 5.

The upper bow assembly 5 comprises a horizontal front bar 12 which serves as a main support and a right and a left anterior-posterior support bar 13 connected at right angles to the front bar adjacent its edge by clamp blocks 14. These blocks are so formed that the bar 12 and each bar 13 are offset one above the other, as shown. Also, the bars 13, while longitudinally adjustable in the clamp blocks, are preferably connected to said blocks to be non-rotational. Suitable key means may be provided for this purpose. The adjustment of the bars 12 and 13 relative to blocks 14 may be locked, as by clamp screws 15.

The bars 13 extend in parallelism from blocks 14 and, at their free ends, each bar 13 carries a recording element 16. The latter essentially comprises a horizontal recording section 17, a vertical recording section 18, a projecting ear 19 on section 18, and a projection 20. Said element is preferably formed of a sheet metal capable of being magnetized and, thereby, of attracting magnetic members. Element 16 may be advantageously made of a ferrous metal.

As shown, sections 17 and 18 comprise flat portions of element 16 that are bent at right angles to each other. The ear 19 has an adjustable pivotal connection at 21 in the cleft 22 of the free end of bar 13. The screw 21, when tightened, flexes the bar 13 over projection 19 and clamps the element 16 in adjusted position.

Each projection 20 carries a part 23 which, in turn, carries an indicating pin 24. A screw 25 connects projection 20 and part 23, in a manner that allows not only pivotal adjustment of part 23, but also anterior-posterior adjustment of said part relative to bar 13. A screw 26 in part 23 locks the transverse adjustment of indicating pin 24.

The clutch means 6 is carried by bow 5 by means of a clamp block 30, mounted for longitudinal adjustment on bar 12, and a stem or stud 31 adjustable relative to said block in a direction transverse to bar 12. A clutch 32, formed as a pan or tray, is adapted to be affixed to the upper jaw by cement or similar material and is carried by said stem 31. Stem or stud 31 is offset below bar 12. Thus, said clutch is adjustable along said bar, transversely thereto, and angularly around the axis of said bar. This three-dimensional adjustment allows for universal adjustability of the clutch relative to bar 12.

Adjacent clamp block 30, the bar 12 carries a clamp block 35 that is adjustable longitudinally on bar 12 and angularly around the axis of said bar. This block 35 embodies a clamp socket 36 for adjustable attachment of the axis-orbital plane recorder bow 9. Said block 35 is preferably located to be on the right side of the head, i. e., to the right of the nose.

The bar 12 of bow 5 is also provided with right and left anterior markers 37. Each said marker is shown as comprising a block 40 longitudinally and angularly adjustable on bar 12, a guide 41 carried by the block, and a stylus pin 42 slidably guided in guide 41. Each said pin 42 has a magnet 43 secured thereto as by a set screw 44. By making guides 41 of a magnetizable material, the styli may be held retracted merely by moving the magnets so their fields will cause them to "stick" to said guides. By pushing on the ends of styli 42, this attraction may be broken, the magnets serving as weights that project the marking ends of the styli into operative position.

The lower bow assembly 7 comprises a horizontal front bar 50 which serves as a main support, and a right and left anterior-posterior support bar 51 connected at right angles to the front bar adjacent its ends by clamp blocks 52. These clamp blocks are similar to clamp blocks 14 and interconnect bar 50 and bars 51 in substantially the same way that bars 12 interconnect with bars 13. Thus, bars 51 are universally adjustable with respect to bar 51. Also, blocks 52 hold bars 51 non-rotationally.

The bars 51 extend in parallelism from blocks 52 and, at their free ends, each said bar carries a marking means 53 that is operatively associated with element 16, the same being in right and left hand arrngement, as shown.

Each marking means 53 comprises a member formed to have a horizontal guide 54 and a vertical guide 55 to guide the respective stylus pins 56 and 57. Said guide member is advantageously made of a ferrous metal so as to attract the magnet weights 58 and 59 respectively mounted on pins 56 and 57. Thus, as described for pins 42, pins 56 and 57 may be retained in retracted position. Pins 57 may project gravitationally as do pins 42. Pins 56 are held projected by the magnetic attraction between weights 58 and recording sections 18 with which operatively associated.

The clutch means 8 is carried by bow 7 by means of a clamp block 65 mounted for longitudinal adjustment on bar 50, and a stud 66 adjustable relative to said block 65 in a direction transverse to bar 50. A clutch 67 is adapted to be affixed to the lower jaw by cement or similar material and is carried by stud 66 which is offset above bar 50. Said clutch 67 is thus mounted on the bow 7 to have universal adjustability, comparable to the adjustability of clutch 32.

Right and left, preferably magnetic, recording plates 70 are carried by bar 50 as by clamp blocks 71. The latter blocks may be adjusted with respect to stylus pins 42, as desired.

It will be understood that pins 42, 56 and 57 may carry marking dye to be transferred to their respective plates. However, it is preferred to carbon coat said plates 17, 18 and 70, and to have the points of the stylus pins mark by cutting into said coats of carbon.

The axis-orbital plane recorder 9 does not, per se, form part of this invention. However, the same has combining features with the above described apparatus, which will become more clearly evident from the following description of the method employed in using the present recorder.

The first requirement for use of the present mandibular movement recorder is to construct or select a properly fitting pair of clutches 32 and 67, the same being made for ready insertion into and removal from the mouth of a patient, or subject. By use of a zinc oxide eugenol cement or the like, said clutches are fastened to the respective upper and lower jaws by application over the gum ridges and/or teeth. In order to avoid recording error, assurance must be had that the clutches do not have any movement relative to the jaws to which cemented.

The procedure is to first locate and mark the face, just anterior to the ears, with spots or marks representing the opening and closing axis (hinge axis) of the lower jaw. Also, a point corresponding to the lower border of the right eye orbit is projected to the right side of the nose in the plane of the hinge axis and lower border of the right eye orbit, and marked on the nose as the orbital plane level. These three points are either permanently marked or, by the use of an axis-orbital plane recorder, found each time the same are needed for transferring a patient's jaw characteristics to a dental articulating device.

Now, the clutches 32 and 67 are cemented in place to the respective upper and lower jaws and the studs or stems 31 and 66 fastened to the respective clutches. With the lower jaw in centric position, the bar 12 of the upper bow 5 is adjusted in clamp block 30 so that said bar is parallel to the hinge axis of the lower jaw, as shown by the marks just anterior to the ears, above mentioned. Centric position of the lower jaw is its posterior terminal position bilaterally.

The marking devices 37 are now adjusted on bar 12 so that the stylus pins 42 thereof are at right angles to the top surface of the plate 70.

Then, the bars 13 are adjusted, after connection to bar 12 by blocks 14, so that the inwardly directed ends or points of indicating pins 24 point and are close to the mentioned marked opening-closing axis points. Also, the recording section 17 is adjusted around hinge screw 21 as a center so that the plane or surface of said section is 30° divergent below the axis-orbital plane above established. Now, the pins 24 are given a fine adjustment to bring them into light contact with the skin of the face. The screw or pivot 25 is used in this fine adjustment of pins 24 since the latter may be moved up and down as well as back and forth in the slotted mount for screw 25.

The lower bow 7 of the present device is set up by attaching stud 66 to clutch 67 and adjusting the front bar 50 in clamp block 65 so that said bar is parallel to bar 12. The plane of the recording plates 70 is set then so that an extension of said plane passes through the hinge axis as shown by the position of indicator pins 24. The position of said plates is adjusted to bring their forward edges just forward of the stylus pins 42. Said plates and pins are also centered, as shown in Fig. 1. These adjustments are all made with the lower jaw in centric position.

Bars 51, by means of clamp blocks 52, are then connected to bar 50 in position to bring the marking point of horizontal stylus pins 56 in alignment with the aligned indicator pins 24. This will bring said pins 56 near the rear and nearer the upper edges of recording sections 18. Therefore, the vertical stylus pins 57 will have a position nearer the outer edges of the recording sections 17. In practice, the pins 56 and 57 are preferred to be initially positioned about one-half inch anterior to the rear edges of the elements 16.

All of the marking pins 42, 56 and 57 are retracted by causing their magnets to be attracted by the respective guides of said pins. If the surfaces of plates 17, 18 and 70 are not coated, as before indicated, the same are now so coated.

By applying gentle pressure in a straight back direction, the operator aids the placement of the subject's jaw in true centric position. Now, the three sets of stylus pins are released from their retracted position to fall gravitationally against their respective recording sections or plates or be attracted to said plates, as the case may be. With the pins in recording position, the subject is instructed and guided into a right lateral movement of the lower jaw by swinging the same to the right. At the end of this movement, the six stylus pins are retracted and the jaw returned to centric position. This jaw movement may be repeated to check the correctness of the first movement and to make sure that the border movement of the jaw has been recorded.

The procedure is repeated for the left lateral movement of the jaw. After the jaw has been returned to centric position, the subject is instructed to protrude the lower jaw directly forward and to hold this position to the limit of protrusion. After the stylus pins have recorded this movement, the same are retracted and the recordings are completed.

To insure against marring or accidental obliteration of the three sets of marks thus made, the plates 17, 18 and 70 may be masked by transparent tapes or sheets. Hence, the stylus pins may be placed in position thereagainst with insurance that the recordings will remain accurate and unmarred.

It will be noted that the bows 5 and 7 are provided with studs 75 that are affixed to the respective bars 12 and 50 of said bows by clamp blocks 76. With the studs 75 in close but non-touching apposition and with the subject's jaw in centric position, a quick-setting cement or plastic stone is applied between and around said studs. Since said studs are provided on the right and left sides of the bows, when said stone is hardened, the bows are fixedly secured together. Screws 90 hold together sections 78 to the respective studs 31 and 66.

Now, the recorder may be removed by separating the sections 78 from their said respective studs by removing screws 90 and inserting a suitable edged tool therebetween. After removal, the clutches are re-assembled, as shown in the drawing, so that the device may be placed in a dental articulator in the same position it had on the subject's head.

Since the axis-orbital plane previously mentioned must be established also on the dental articulator, before removal of the recording device from the jaws, the orbital bow 9 is mounted, by a stud 80, in the socket 36 with the free ends 81 of said bow 9 resting upon indicator pins 24. Said stud 80 is adjusted to bring a level indicator 82, on the bow, level with the mark on the nose (previously mentioned). The bow 9 may be leveled by means 83.

Before mounting the present recorder in a dental articulating device, the clutches 32 and 67 are filled with cement or plastic stone and the same is used to attach the recorder to such an articulating device in which all of the jaw movements recorded may be duplicated exactly by following the record marks on the plates or sections 17, 18 and 70.

While the foregoing has illustrated and described what is now contemplated to be the best mode of carrying out the invention, the construction is, of course, subject to modification without departing from the spirit and scope of the invention. It is, therefore, not desired to restrict the invention to the particular form of construction illustrated and described, but to cover all modifications that may fall within the scope of the appended claims.

Having thus described the invention, what is claimed and desired to be secured by Letters Patent is:

1. A mandibular movement recorder comprising upper and lower bow assemblies adapted to be mounted on the respective upper and lower jaws, marker means mounted on one bow assembly, recorder means in operative association with the marker means and carried by the other bow assembly, and an axis-orbital plane recorder bow mounted on said upper bow assembly.

2. A mandibular movement recorder comprising upper and lower bow assemblies adapted to be mounted on the respective upper and lower jaws, marker means mounted on one bow assembly, and recorder means in operative association with the marker means and carried by the other bow assembly, said marker means comprising six markers, two at the front of the bow assembly on which carried and four at the rear arranged two on each side of said latter assembly, and the recorder means comprising six recorder plates positioned to receive the marks of said six markers.

3. A mandibular movement recorder comprising upper and lower bow assemblies adapted to be mounted on the respective upper and lower jaws, magnetic marker means carried at the front of the upper bow assembly, recorder means carried at the front of the lower bow assembly, said marker and recorder means being in register to record protrusion movement of the lower jaw as imparted to the lower bow assembly, additional magnetic marker means carried at the rear of the lower bow assembly, and additional recorder means carried at the rear of the upper bow assembly, said additional marker and recorder means being in register to record lateral movement of the lower jaw.

4. A mandibular movement recorder comprising upper and lower bow assemblies adapted to be mounted on the respective upper and lower jaws, marker means carried at the front of the upper bow assembly, recorder means carried at the front of the lower bow assembly, said marker and recorder means being in register to record protrusion movement of the lower jaw as imparted to the lower bow assembly, and marker means carried by the upper bow assembly on each side thereof and recorder means carried by the lower bow assembly in register to record lateral movement of the lower jaw as imparted to the lower bow assembly, each marker means comprising a magnetizable guide, a marker element movable in said guide, and a magnet carried by said element to hold the latter retracted when said magnet is in magnetic engagement with the guide.

5. A mandibular movement recorder according to claim 4: the recorder means each comprising a magnetizable plate to attract and, thereby, project the magnets of the marker elements when released from the guides of said elements.

6. In a mandibular movement recorder having upper and lower bow assemblies with means carried by each assembly adapted to be cemented to the respective upper and lower jaws to, thereby, affix said bow assemblies to the jaws so as to move therewith, the improvement comprising marker means carried by one bow assembly, recorder means carried by the other bow assembly to receive marks from the marker means upon movement of one jaw relative to the other, magnetic means to retract said markers to non-marking position with respect to the recorder means.

7. Mandibular movement recording means comprising a recorder plate adapted to be carried by one jaw, a stylus pin normal to said plate and adapted to be carried by the other jaw, a magnet affixed to said pin, and a magnetizable guide for said pin to attract the magnet and, thereby, retract the pin to a non-marking position.

8. Mandibular movement recording means according to claim 7: said guide and pin being vertically disposed and said magnet constituting a weight to move the pin into marking position upon release of the magnet from attraction to the guide.

9. Mandibular movement recording means according to claim 7: said guide and pin being horizontally disposed, and the recorder plate being magnetizable to attract said magnet to project the pin into marking position upon release of the magnet from attraction to the guide.

10. A mandibular movement recorder comprising an upper U-shaped bow assembly, a pair of recorder elements mounted on said assembly, one of said elements being mounted on one side and the other element being mounted on the other side of the open end of said U-shaped bow, a pair of indicating pins adjustably mounted on said recorder elements, said pins being in a horizontal plane and directed inwardly, marker means adjustably mounted at the closed end of said U-shaped bow, a lower U-shaped bow assembly operatively associated with the upper bow assembly, a pair of marker means mounted on said lower bow assembly, one means being on each side of the open end of the U-shaped bow and in register with the recorder elements mounted on the upper bow assembly, and recorder means adjustably mounted on said lower bow in register with the marker means mounted on the upper bow.

11. A mandibular movement recorder according to claim 10: including means attached to said upper bow assembly and means attached to said lower bow assembly, each means being fixed in the mouth of a patient and adapted to impart mandibular movement to said assemblies.

12. A mandibular movement recorder according to claim 10: including an axis-orbital plane recorder bow mounted on said upper bow assembly.

13. A mandibular movement recorder according to claim 10: in which each marker means comprises a guide member, a pin movable in said guide member, and a magnetic weight attached to said pin.

14. A mandibular movement recorder according to claim 10: in which each recorder element has a horizontal portion and a vertical portion, and in which each marker means on the lower bow comprises a pair of pins, one horizontal pin adapted to mark the vertical recorder element portion, and one vertical pin adapted to mark the horizontal recorder element portion.

15. A mandibular movement recorder according to claim 14: in which the lower bow assembly is adjustable relative to the upper bow assembly to align the horizontal pins of the marker means with the indicating pins.

16. A mandibular movement recorder according to claim 15: including means interconnecting said upper and lower bow assemblies adapted to lock said assemblies in adjusted position.

References Cited in the file of this patent
UNITED STATES PATENTS 2,418,648   Kile _____ Apr. 8, 1947